(12) United States Patent
Kahawala et al.

(10) Patent No.: US 12,511,413 B2
(45) Date of Patent: *Dec. 30, 2025

(54) DOCUMENT CREATION AND MANAGEMENT SYSTEM

(71) Applicants: Atlassian Pty Ltd., Sydney (AU); Atlassian US, Inc., San Francisco, CA (US)

(72) Inventors: Dilani Kahawala, San Carlos, CA (US); Venkatram Ramanathan, San Jose, CA (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/743,002

(22) Filed: Jun. 13, 2024

(65) Prior Publication Data

US 2024/0419823 A1    Dec. 19, 2024

Related U.S. Application Data

(63) Continuation of application No. 17/565,811, filed on Dec. 30, 2021, now Pat. No. 12,032,710.

(51) Int. Cl.
*G06F 21/62* (2013.01)
*G06F 3/0482* (2013.01)

(52) U.S. Cl.
CPC ........ *G06F 21/6209* (2013.01); *G06F 3/0482* (2013.01); *G06F 2203/04803* (2013.01); *G06F 2221/2147* (2013.01)

(58) Field of Classification Search
CPC .............. G06F 21/6209; G06F 3/0482; G06F 2203/04803; G06F 2221/2147
USPC ......................................................... 726/26
See application file for complete search history.

(56) References Cited

U.S. PATENT DOCUMENTS

| | | | |
|---|---|---|---|
| 2008/0288532 A1* | 11/2008 | Aboukrat | G06F 21/6209 |
| 2009/0083656 A1* | 3/2009 | Dukhon | G06F 3/0482 715/781 |
| 2018/0024731 A1* | 1/2018 | Sanches | G06F 3/04817 715/763 |

* cited by examiner

*Primary Examiner* — Michael S McNally
(74) *Attorney, Agent, or Firm* — Brownstein Hyatt Farber Schreck, LLP

(57) ABSTRACT

Described herein is a method, for managing creation and publication of a document in a documentation management system (DMS), that includes causing display of a first graphical user interface (GUI) on a first client device. The method includes authenticating a first user of the first client device, and causing display of an author view of a hierarchical document structure in a navigational pane of the first GUI. The method includes saving content received in an editor pane of the first GUI as a page in the DMS and associating the first user as an author of the page. The method includes generating a document entry displayed with a draft status indicator corresponding to the draft status of the page. The method includes causing display of a reader-view of the hierarchical document structure on a second GUI with the content of the page displayed in accordance with the draft status.

18 Claims, 10 Drawing Sheets

CONFLUENCE   HOME ˅   RECENT ˅   SPACES ˅   PEOPLE   APPS ˅   [CREATE]   [Q SEARCH]   ♡ ⊙ ⓠ

EXXTREME TRAVEL

≡ OVERVIEW
🔖 BLOG
❓ QUESTIONS
📅 CALENDARS
📄 PAGES
▸ CURRENT TOURS
▸ MARKETING CAMPAIGN
▾ TOURS IN DEVELOPMENT
   • ROCK CLIMBING IN COLORADO
422 ⇄ • KAYAKING IN OREGON
   • SNORKELING IN LOS CABOS
   • LEARN TO SURF IN HAWAII
   • SNORKELING WITH SHARKS
▸ PROPOSED TOURS
▸ EXXTREME TRAVEL OFFERS ROADMAP
▸ PRODUCT MARKETING GROUP
⚙ SETTINGS

---

EXXTREME TRAVEL

PAGES

[🔍 _____]   [MY PAGES]   ⋮ MANAGE PAGES / ARCHIVED PAGES / SPACE SETTINGS

📊 CURRENT TOURS — INFRASTRUCTURE CHANGE MANAGEMENT     🕒 5 HR AGO ☆ ⋯ — 402

📊 MARKETING CAMPAIGN — SALES OPS     🕒 1 HR AGO ☆ ⋯ — 404

📊 TOURS IN DEVELOPMENT — SALES OPS     🕒 1 HR AGO ★ ⋯ — 406

⇄ 420

🌐 ROCK CLIMBING IN COLORADO [DRAFT] — 416 — BEYOND GRAVITY     🕒 14 HR AGO ☆ ⋯ — 408

⚠ KAYAKING IN OREGON [PUBLISHED] — 418 — TRAVEL & RELOCATION SUPPORT     🕒 17 HR AGO ☆ ⋯ — 410

⚡ SNORKELING IN LOS CABOS [UNPUBLISHED CHANGES] — IT OPERATIONS     🕒 20 HR AGO ☆ ⋯ — 412

◎ LEARN TO SURF IN HAWAII — DIGITAL MARKETING SUPPORT     🕒 1 DAY AGO ★ ⋯ — 414

DOCUMENT CREATION AND MANAGEMENT SYSTEM

CROSS-REFERENCE TO RELATED APPLICATION(S)

This application is a continuation patent application of U.S. patent application Ser. No. 17/565,811, filed Dec. 30, 2021 and titled "Document Creation and Management System," the disclosure of which is hereby incorporated herein by reference in its entirety.

TECHNICAL FIELD

Embodiments described herein relate to a document creation and management system and, in particular to systems and methods for creating and managing a document in an author view and a reader view.

BACKGROUND

An organization may require employees to work in a team environment. While working in the team environment, some traditional tools for managing a document creation and publication do not allow an employee working on a draft of a document benefits of automatic saving of the draft within a document structure, version control, and/or limiting the draft's availability when the draft is restricted to a group of selected people or to the author of the draft alone. Further, using some traditional systems, the author of the draft cannot easily view and/or set a status of the draft. The systems and techniques described herein may be used to enhance the functionality and features available for author-generated content saved in draft form.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

FIG. 4 is another example screen of the GUI of the front end application of the document management system, as described herein.

FIG. 5 is another example screen of the GUI of the front end application of the document management system, as described herein.

The use of the same or similar reference numerals in different figures indicates similar, related, or identical items.

Figure 1:
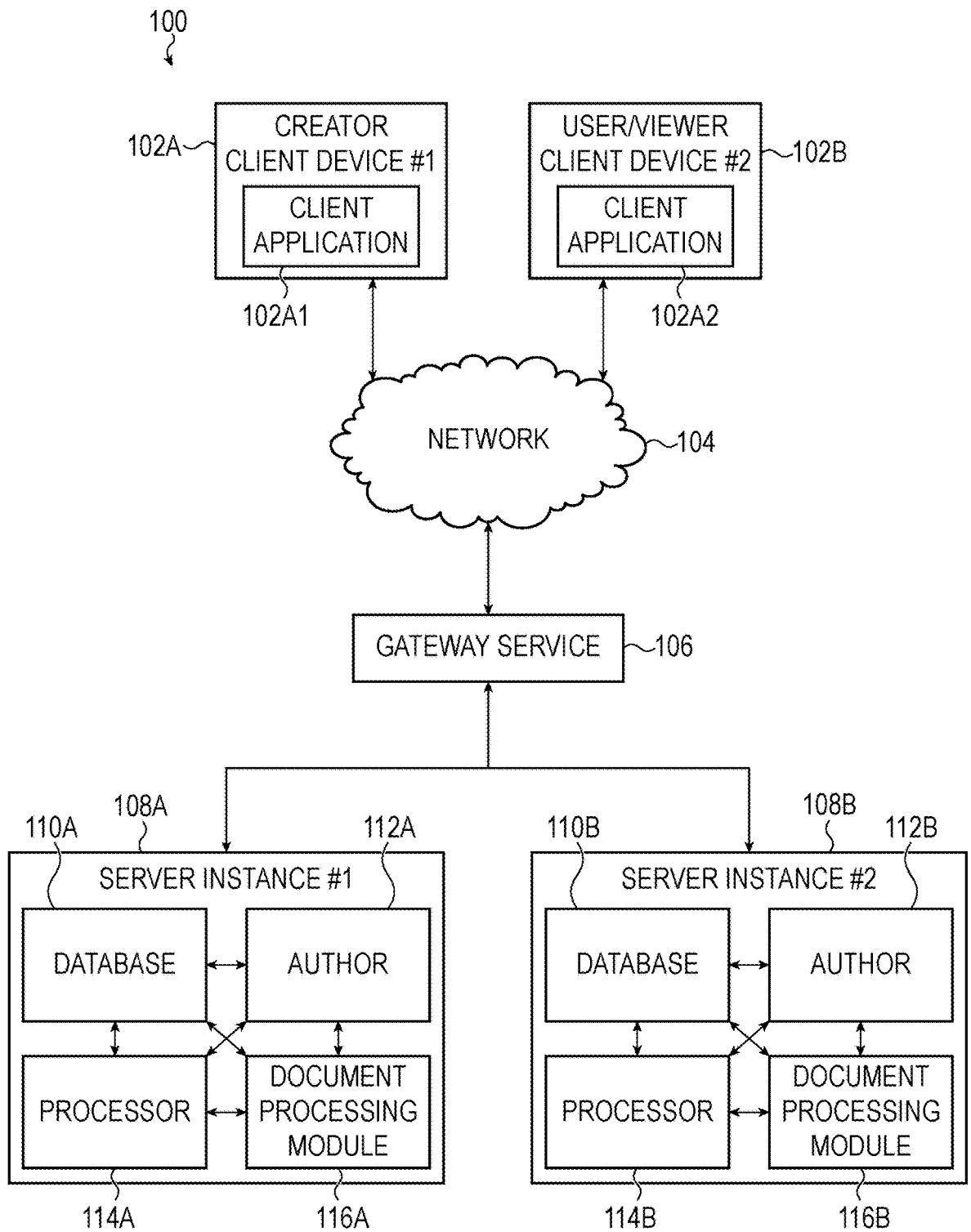
FIG. 1 depicts a networked computing environment in or over which embodiments, as described herein, may be implemented.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems and methods for managing a document creation and publication in a document management system. As a result of the systems and methods described herein, a user or team of users of a document management system can create a document draft, set an appropriate draft status, make the document draft available to a group of selected team members, and publish the document when the document draft is complete. As a result, an author or creator of the document draft does not have to worry about review or feedback from other team members while the document draft is still in progress. The document draft would only be available to the author while the document is not yet published. In pre-published state of the document draft, the document draft if made available to a group of selected team members, the draft status would inform other team members when the author is requesting review and comments from the team members.

For example, a user may be working on a new concept, and may have been asked to draft a document. While the user is working on the draft, the user may go through many iterations before the draft is finalized and ready for review and/or receive comments from other team members. The user creating the draft may be referred in the instant disclosure as an author or a creator of the document. Some traditional document management systems do not allow a user to work on the draft without the work-in-progress draft being unavailable to other users of the document management system while still allowing the draft to be available or displayed in an existing hierarchical document structure. As a result, the user may prematurely publish the document and, thus, receive feedback and/or comments on the draft document, which is still being improved by the user.

Various embodiments described in the present disclosure enables the user to work independently and without a fear of receiving comments on a work-in-progress draft. The embodiments described herein may allow the user to set a draft status of the document, which may be readily designated in a hierarchical document structure and in the view of the document itself. The draft status may be selected from a plurality of pre-populated draft statuses. In some cases, the user may also create one or more custom draft statuses. The draft status selected by the user may determine visibility of the draft document to other users of the document management system.

In some embodiments, the user may also allow the document to be visible to a specified or predetermined subset of users of the document management system while the document is still not in its final state and ready for publication. For example, the user may be required to get feedback from his/her supervisor on the draft document. Accordingly, the user may select one or more users of the document management system to have access to the draft document while the draft document is still in pre-publication state. The pre-publication state may refer to a status of the draft document, which is not published and hence it is unavailable to the users of the document management system in accordance with the permissions set for the users.

In some embodiments, the user may share the draft document with other users by issuing a share command. The user may select a method for sharing the document, for example, via an email, via a text message, via an in-app notification, and so on. The document may be shared as a copy of the document and/or a link to the document. The user may also add another user to the specified or predetermined subset of users who may have been granted access to the draft document while the draft document is still in pre-publication state. The other user may be a co-worker, a co-author, a supervisor, a reviewer, a mentor, and so on.

In some embodiments, a user creating a draft document may have a different view or be presented with a different version of a plurality of documents displayed on a graphical user interface (GUI) of a client device used for creating and editing the draft document. A view of the GUI presented to the creator of the document may be referred as an author view. Other users of the document management system may have a different view or be presented with a different version of the plurality of documents that is different from the author view. Documents and elements displayed for a non-author may be referred to as a reader view. In some cases, a representation of plurality of documents may be presented in a hierarchical manner that indicates parent-child relationships between documents in a common document space or other organizational scheme. The draft document that the user has created and in pre-publication state may only appear in the author view, but may not appear in the reader view, as described herein.

Thus, the author view or the reader view of the document hierarchy presented to a user may not be associated with a particular client device, but associated with a user authentication. For example, there are two users-a user A and a user B. The user A has created a document A; thus, the user A is an author or a creator of the document A. The user A has not shared the document A with the user B. The user A has set the document A's draft status indicator as a pre-publication state. Accordingly, when the user A uses a client device A to access the document management system using a GUI of a frontend application executing on the client device A, a page tree shown in the GUI on the client device A may list the document A. But, when the user B uses the client device A to access the document management system using the GUI of the frontend application executing on the client device A, a page tree shown in the GUI on the client device A may not list the document A, because the user B is not an author or a creator of the document A, and the user A has not shared the document A with the user B. For example, if the user A uses a client device B to access the document management system using a GUI of a frontend application executing on the client device B, a page tree shown in the GUI on the client device B may list the document A. Thus, a page tree displayed may include different documents based on the user.

Further, the document hierarchy represented in an author view when a user having a document in a pre-publication state is logged in and authenticated using a client application on a client device may be different in a reader view when another user, who is not an author of the document in the pre-publication state and who is also not a one of a specific or predetermined subset of users, is logged in and authenticated using the client application on the client device. In other words, a client application executing on a client device may display and/or suppress one or more documents of a document hierarchy based on an authenticated user using the client application.

A GUI view showing a page tree, when a user accessing a document management system is an author of at least one document displayed in the page tree, the GUI view may be referred as an author view of a page tree. Similarly, a GUI view showing a page tree, when a user accessing a document management system is not an author of at least one document displayed in the page tree, the GUI view may be referred as a reader view of a page tree.

In some embodiments, the status of the draft document may be displayed in the author view. The status of the draft document may be displayed continuously while the author is editing the draft document. In some cases, in the author view, the author may be presented a list of a number of draft documents that the author is currently working on. The list of the number of draft documents may be displayed according to a number of criteria, for example, based on a name of the draft document, an editing date of the draft document, a status of the draft document, and so on. The author may select a specific draft document from the list and further update the draft document.

In some embodiments, the draft document being created and/or updated by the author may be automatically saved. In some embodiments, when the author is exiting the document management system, the author may be presented a dialog box to confirm and/or update a draft status of the document. In some cases, a draft status of the document may, by default, be set as a pre-publication state. Accordingly, unless the author may set a different draft status for the draft document, the draft document may automatically have a status as a pre-publication state. In the pre-publication state, the draft document may only be visible in the author view, as described herein. The author may update the draft status of the document to a published state, and the draft document then may be available for viewing by other users of the document management system according to various permissions set for the users.

In some embodiments, the draft document when displayed in the author view and/or the reader view, the draft document may be selected for performing various actions, for example, viewing, editing, updating, saving, and/or publishing, and so on, on the selected draft document.

In some embodiments, in the author view and/or the reader view, a user may search a specific document based on a number of search criteria. In case, one or more documents matching a given search criteria is found, the found document may be displayed in the author view and/or the reader view, as described herein.

In some embodiments, each of the one or more documents may be displayed with their draft status indicator. Accordingly, a document in its pre-publication state may be displayed in the author view if the user is an author or a creator of the document with the draft status indicator showing its status as pre-publication state, while the document in the pre-publication state may be displayed in the reader view with its draft status indicator indicating the document is in pre-publication state if the user is one of the specific or predetermined subset of users or with whom the author or the creator of the document has shared the document.

Various embodiments described above may be related to a front end application running on a client device. The front end application may be communicatively coupled with a document management system having a backend application. The backend application may create a document entry of a draft document created by the user, and save the draft document on the document management system. The document may be saved in a memory and/or a database in a local or cloud environment. The backend application may also save other information, for example, an author name, a draft status of a draft document, and so on, associated with the document in the memory and/or the database.

In some embodiments, the backend application may authenticate a user of the document management system, and based on the authentication result, the backend system may determine and generate an author view and/or a reader view of a document hierarchy on a GUI on a client device of the user. The user may be presented an author view in reference to a draft document for which the user is an author, and the user may be presented a reader view in reference to a draft document for which the user is not an author. In other words, when a user is authenticated, and displayed a number of documents according to the document hierarchy (or a page tree), a document may or may not be displayed in the GUI depending on whether the user is an author or a creator of the document, or the user is one of the specific or predetermined subset of users or with whom the author or the creator of the document has shared the document. Accordingly, the document hierarchy may be different from one user to another user.

In some embodiments, the backend application may periodically evaluate one or more draft documents based on its content. If a draft document of the one or more draft documents is determined to be an empty document or a blank document, in other words, having no data, then such an empty or a blank document may be removed or deleted automatically. In some cases, the author of the empty or the blank document may be sent a notification regarding the empty or the blank document before the empty or blank document is deleted or removed from the memory and/or the database.

In some cases, an author or a creator of a blank document may be send a notification or a reminder of an incomplete or unfinished and/or a blank document after a certain number of days, for example, 7 days, are passed since the blank document is created and/or last accessed by the author of the blank document. In some embodiments, removal or deletion of the blank document may occur after the blank document has not be accessed and/or updated for a specific time duration, for example, 30 days.

In some embodiments, the draft document may be a child document and may have another parent document. The parent document and the child document both may have their draft status set as a pre-publication state. However, if the author sets the draft status of the child document to a published state, the backend application may also update the draft status of the parent document to a published state. In some cases, if a parent document is removed or deleted, the backend application may designate the child document as a parent document.

A document in the present disclosure may also be referred to as a page or a webpage. The document may be created using any application running on a client device. Accordingly, the document may be a word document, a pdf document, a spreadsheet, an image, a PowerPoint presentation or a slide set, and/or a video, and so on. The document may be displayed as a uniform resource locator (URL) on a page or a webpage on the GUI of the client device. In some cases, the document may be an issue (e.g., a bug or a customer reported issue/trouble ticket), an issue description, a blog post, a text entry, and/or any other form of user-generated content.

Various embodiments described above are thus related to systems and method for managing a document creation and publication. The embodiments described herein may allow the user to create a document without a fear of an incomplete draft of the document being available to other users and receiving feedback or comments on an incomplete draft of the document. In the following sections, various embodiments are described using drawings.

FIG. 1 depicts a networked computing environment in, or over which embodiments as described herein may be implemented. As shown in FIG. 1, a computing environment 100 may include a first client device 102A and a second client device 102B. The first client device 102A may be a client device on which a first user may be creating a document. Accordingly, the first client device may be a client device that belongs to a creator or an author of the document. The second client device 102B may be a client device belonging to another user, and may be used to access various documents, including the document created by the author on the first client device 102A. The second client device 102B may thus belong to a viewer of the document.

In accordance with some embodiments, the first client device 102A and the second client device 102B may be communicatively coupled with a network 104. The network 104 may be a local area network (LAN), a wide area network (WAN), a cellular network such as a 3G network, a 4G or a long-term evolution (LTE) network, and/or a 5G network, and so on. The first client device 102A and the second client device 102B may be communicatively coupled with one or more instances of an application server, for example, a first server instance 108A and/or a second server instance 108B, via a gateway service 106.

By way of a non-limiting example, in some embodiments, the gateway service may be a load balancer system or a load balancer service. The gateway service 106 may route the first client device 102A and/or the second client device 102B to the first server instance 108A and/or the second server instance 108B based on various criteria, including but not limited to, a central processor usage, a memory usage, and/or a bandwidth availability, and so on.

In some cases, each client device may be statically assigned a particular server instance. For example, the first client device 102A may be statically assigned to the first server instance 108A. Accordingly, all requests from a front end application running on the first client device 102A may be forwarded to the first server instance 108A.

In some cases, each client device may be dynamically assigned a server instance. Accordingly, all requests from a front end application running on the first client device 102A may be forwarded to the first server instance 108A and/or the second server instance 108B based on the various criteria mentioned above, such as a central processor usage, a memory usage, and/or a bandwidth availability, and so on.

In some cases, the first server instance 108A and/or the second server instance 108B may implemented on a physical hardware or a virtual machine. Each of the first server instance 108A and the second server instance 108B may include a database 110A or 110B, an authentication module 112A or 112B, a processor 114A or 114B, and/or a document processing module 116A or 116B. The document processing module 116A and/or 116B may be a backend application mentioned above.

In some embodiments, the first server instance 108A and the second server instance 108B may be communicatively coupled with each other. The first server instance 108A and the second server instance 108B each may be periodically synced with each other using a sync service. In some cases, the first server instance 108A and the second server instance 108B may be configured to provide redundancy, for example, as an active-active mode, an active-standby mode, and so on.

In some embodiments, each of the first client device 102A and/or the second client device 102B may be running a frontend application 102A1 and/or 102B2, respectively. The frontend application may be configured to operate as an instance of software (a "client application") executing on a client device and the backend application running on the first server instance 108A and/or the second server instance 108B may be configured to operate as an instance of software (a "backend application") executing over a processor allocation and memory allocation of a cloud computing platform, which may include one or more physical or virtual host servers.

Accordingly, as described above, the frontend application and the backend application may be configured to communicate over one or more networks, including private and public networks, to exchange information related to managing a document creation and publication. For example, a user device such as a laptop may be configured to leverage a processor and memory thereof to instantiate an instance of the frontend application, which in turn may leverage a display of the laptop to render a graphical user interface (GUI) for the document management system to the user. In some cases, the frontend application may be configured to operate in a browser of the laptop, although this is not required of all embodiments. In other cases, the frontend application may be a native application.

The user of the laptop can operate the graphical user interface of the frontend application to create a draft document, which may be stored in the database 110A and/or 110B. More particularly inputs received by the graphical user interface of the frontend application may cause the frontend application to generate one or more requests to one or more application programming interfaces (APIs) of the backend application. In response to the requests, the backend application may store the received data in the database 110A and/or 110B and may display to the user via the graphical user interface.

In some embodiments, the backend application may cause the number of documents displayed on the GUI of the client device based on authentication of the user. For example, a user A may be creator of a document A, which is still a draft and not yet finalized. The document A may therefore have its draft status set as a pre-publication state either by the creator of the document or by default. When a user A may execute the front end application, the document A may be displayed on a GUI of a client device of the user A, but the document A may not be displayed on the GUI of a client device of the user B.

The document A may be presented along with other documents as a list, as a tree showing the documents in a hierarchical manner, and so on. The hierarchical presentation of the documents may be referred in the present disclosure as a page tree or a hierarchical document structure. The page tree may designate one or more documents and/or one or more pages associated with a space or a project related to the document management system. Each of the one or more documents and/or pages may be referred as a node of the page tree. Thus, a page tree may include a number of nodes, and each node may be selected by a user to retrieve, access, edit, update, and/or delete the document associated with the node. The page tree may also display each node in a fashion consistent with a relation between them. In other words, a child document may be displayed showing its relationship with its parent document to the user in the page tree.

As described above, the page tree may look different and/or may include a different set of documents in an author view of a GUI and in a reader view of the GUI, based on a draft status of each of the documents and other aspects, such as permissions, and so on. Thus, the frontend applications 102A1 and 102B2 may be the same client applications running on the client device 102A and 102B, respectively. However, as described herein, the content displayed may be different based on which user has logged in to the client device, and/or according to the author view and/or the reader view of the page tree.

In some embodiments, by way of a non-limiting example, each document stored in the database may be stored in a database table having following fields:

A document entry ID: A document entry ID may be a unique identification number assigned to each document stored in the database. The document entry ID may be arbitrarily generated or may be a consecutive number incremented for addition of each new document to the database.

A document name: A document name may specify a title of the document and/or a file name of the document as given by an author of the document.

A draft status of a document: A draft status of a document may indicate a current status of a draft, for example, a work-in-progress, ready for review, ready for publication, and/or published, and so on. The draft status of the document may be selected from a pre-populated list of draft statuses or may be set by an author of the document.

Team members: Team members may include a list of other users which may have access to the draft document while the draft status of the document is pre-publication state. By way of a non-limiting example, any of the draft status other than a published state may be a pre-publication state of the draft status. In some cases, team members may automatically include an author of the document and may have full access to the document. In some cases, users other than the author may have a limited access to the draft document in the pre-publication state. For example, one user may view and edit content of the draft and comment on the draft, while another user may only view the content of the draft and comment on the draft. In some cases, such user based permissions may be set by the author of the document. In some cases, such user based permission may be set based on relationship of the author with the other users. For example, a user who is a manager of an author of the draft document may view and edit content of the draft and comment on the draft, but another user who is a team member at the same level in the organization as the author of the draft document may only view the content of the draft and comment on the draft.

In addition to the above, the other fields may include a creation date, a last update date, a size of the document, a type of the document, and so on. The document may be stored as a blob in one of the fields of a database record.

In some cases, the networked computing environment 100 may be implemented with a client-server architecture in which the first server instance 108A and/or the second server instance 108B may exchange requests and responses (which may comply with a communication protocol such as HTTP, TCP, UDP, and the like), with one or more clients, such as the first client device 102A and/or the second client device 102B. In other cases, event-driven architectures may be used. In this manner, a host server of an issue tracking service can serve information to each client device, and in response, each client can render a graphical user interface on a display to present that information to the user (e.g., an author and/or a viewer) of that respective client device.

The frontend application (a client application) may be defined by executable code stored in a memory of, and executed by a processor of, a client device. In particular, as noted with respect to other embodiments described herein, a client device may be supported by one or more virtual or physical hardware devices, referred to herein as resource allocations, that may be leveraged to perform, coordinate, or otherwise instantiate one or more services or functions of the client device.

For example, a client device as described herein can include one or more resource allocation modules or functions (e.g., a processor allocation, a memory allocation, and/or a network connection, and so on) 202A described below with reference to FIG. 2, which can be leveraged to instantiate the client application. In particular, the frontend application can be defined by executable code and/or binary code stored in a persistent memory allocation.

A processor allocation can be configured to access the persistent memory allocation to retrieve the executable instructions and/or binary code and can be configured to load at least a portion thereof into a working memory allocation. With the support and assistance of the memory allocation, the processor allocation can instantiate the frontend application (in some examples, over an operating system) to facilitate interaction with, and use of the client application by, an end-user.

Similarly, the backend application (also referred to as a host service or a server application) may be defined by executable code stored in a memory of, and executed by a processor of, a host device, a server instance, or a service. In particular, as noted with respect to other embodiments described herein, a host device may be supported by one or more virtual or physical hardware devices (co-located or geographical distributed), referred to herein as resource allocations, that may be leveraged to perform, coordinate, or otherwise instantiate one or more services or functions of the host device.

For example, a host device as described herein can include a processor allocation, a memory allocation, and/or a network connection allocation that can be leveraged to instantiate the backend application. In particular, as with the frontend application, the backend application can be defined by executable code and/or binary code stored in a persistent memory allocation.

A processor allocation can be configured to access the persistent memory allocation to retrieve the executable instructions and/or binary code and can be configured to load at least a portion thereof into a working memory allocation. With the support and assistance of the memory allocation, the processor allocation can instantiate the server application (in some examples, over an operating system) to facilitate interaction with, and use of document management system by one or more instances of the client application.

The foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on.

The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways, several of which are described below.

Figure 2:
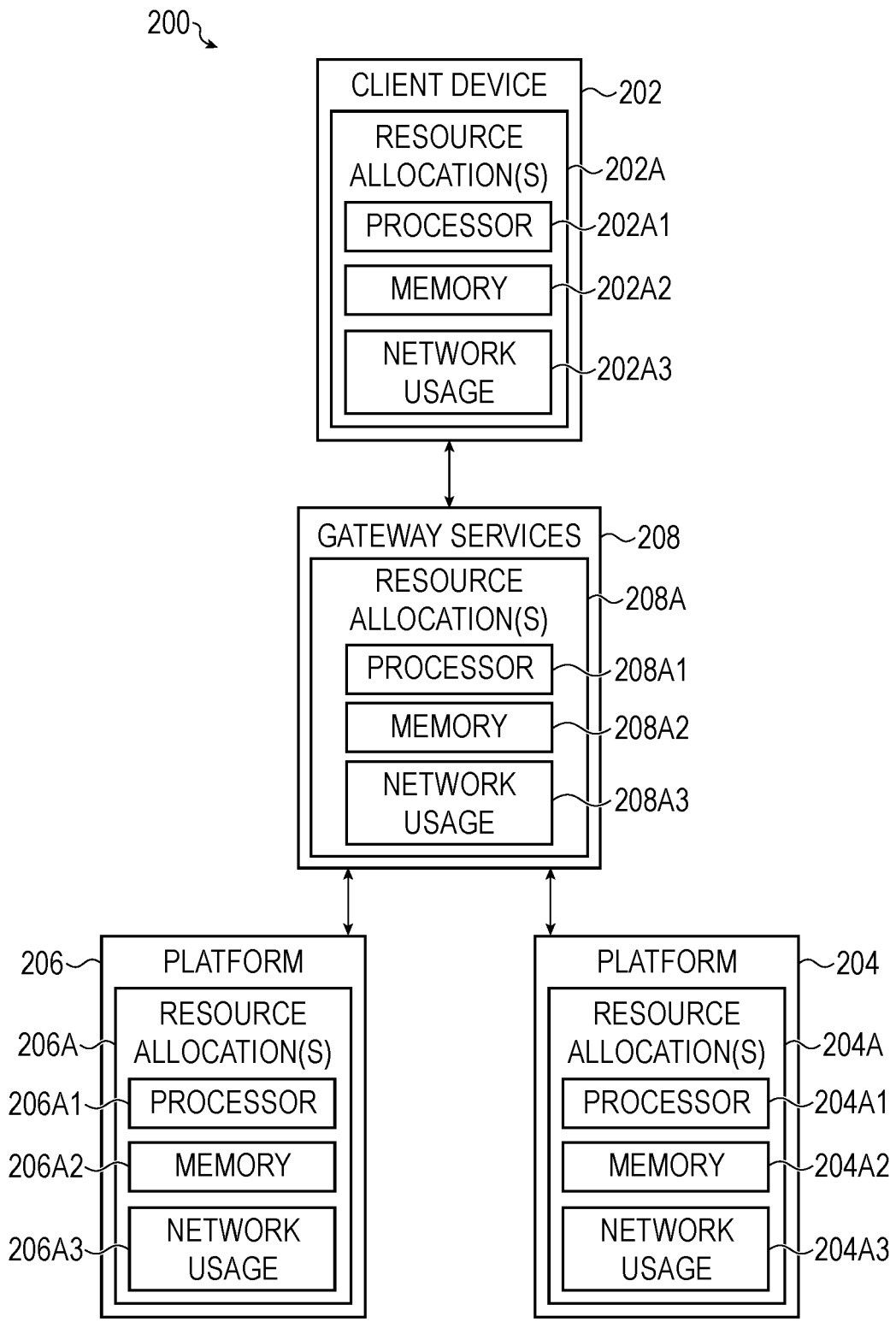
FIG. 2 depicts another view of a networked computing environment in or over which embodiments, as described herein, may be implemented.

FIG. 2 depicts another view of a networked computing environment in, or over which embodiments as described herein may be implemented. As shown in a network 200, a client device 202, including one or more resource allocation modules 202A, may be communicatively coupled to a first platform 204 and a second platform 206, including one or more resource allocation modules 204A and 206A, respectively, via a gateway service 208. The gateway service 208 may also include one or more resource allocations modules 208A.

In some embodiments, the network 200 may, for example, be an intra organization network. A client device 202 may be a workstation, a computer, a laptop, a tablet, and/or another suitable client device. The client device 202 may be implemented as a hardware or as a virtual machine. The one or more resource allocation modules 202A may allocate resources, including but not limited to, a processor or a computational resource 202A1, a memory 202A2, network usage or bandwidth 202A3, and so on, as required by the client device 202. The client device 202 may be running an application ("a client application") which may be a frontend application, referenced herein. In some cases, there may be more than one instances of the backend application running on the client device 202.

The first platform 204 and the second platform 206 may be a sever, an application server, and/or an instance of a server. The first platform 204 and/or the second platform 206 may be implemented as a hardware or as a virtual machine. The first platform 204 and the second platform 206 each may be running an application ("a server application") which may be a backend application, referenced herein. In some cases, there may be more than one instances of the backend application running on each of the first platform 204 and/or the second platform 206. The one or more resource allocation modules 204A and/or 206A may allocate resources, including but not limited to, a processor or a computational resource 204A1 and/or 206A1, a memory 204A2 and/or 206A2, network usage or bandwidth 204A3 and/or 206A3, and so on, as required by the first platform 204 and/or the second platform 206.

The gateway service 208 may acts as a frontend, a broker, a load balancer, and/or a router for the first platform 204 and/or the second platform 206. The gateway service 208 may be implemented as a hardware or a virtual machine. The one or more resource allocation modules 208A may allocate resources, including but not limited to, a processor or a computational resource 208A1, a memory 208A2, network usage or bandwidth 208A3, and so on, as required by the gateway service 208.

In some cases, the client device 202, the gateway service 208, the first platform 204, and/or the second platform 206 may be a microservice, an executable code, a JavaScript, a library, a JAR file, and so on.

The client device 202 may include a processor and a memory. The processor may be any suitable computing device or logical circuit configured to execute one or more instructions to perform or coordinate one or more operations on or to digital data. In many embodiments, the processor or processors of the client device 202 may be a physical processor, although this is not required of all embodiments; virtual components may be suitable in some implementations. Similarly, a memory of the client device 200 may be configured and/or implemented in a number of suitable ways and may be partially or completely virtualized.

In some embodiments, the processor of the client device 202 is configured to access at least one executable asset from the memory of the client device 202. More particularly, the processor of the client device 2-2 may be configured to access a data store portion of the memory to load, into a working portion of the memory, at least one executable asset or executable program instruction. In response to loading the instruction or executable asset into working memory, the processor of the client device 202 may instantiate an instance of software referred to herein as a client application.

In many embodiments, a client application (also referred herein as a "frontend application") may be configured to provide client-side functionality of a software platform (a documentation or content creation service or other collaboration platform). More specifically, the client application may be configured to communicably couple to a separate instance of software executing on, and/or instantiated by, a host system or server configured to provide server-side ("backend") functionality of the hosted platform services, for example, the first platform 204 and/or the second platform 206 (e.g., documentation or content creation service). In this manner, a documentation or content creation service is defined in part by a frontend executing/instantiated on a client device and in part by a backend executing/instantiated on a host server of the hosted platform services 204 and/or 206 in communication with the frontend.

In this example, the first platform 204 and/or the second platform 206 may include a host server supporting the backend configured to operate within, or as, a virtual computing environment that is supported by one or more physical servers including one or more hardware resources such as, but not limited to (or requiring) one or more of: a processor allocation; a memory allocation (also referred to as a working memory); non-volatile storage (also referred to as persistent memory); networking connections; and the like.

Further, it may be appreciated that although referred to as a singular "server", a host server supporting the backend may be a cluster of different computing resources, which may be geographically separated from one another. In this manner, because specific implementations may vary, both the host server (of the first platform 204 and the second platform 206) and the client device 202 can be referred to, simply, as "computing resources" configured to execute purpose-configured software (e.g., the frontend and the backend).

As used herein, the general term "computing resource" (along with other similar terms and phrases, including, but not limited to, "computing device" and "computing network") may be used to refer to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

An example implementation of the network environment of FIG. 1 and/or FIG. 2 is described below with respect to FIGS. 3-9. While the following screen shots and examples are provided as an illustration of the principles of this disclosure, the examples are not intended to be limiting in nature and merely serve to demonstrate the use of the proposed systems and techniques.

In one example use of the network environment of FIG. 1 and/or FIG. 2, a user may have been asked to create, for example, specification for a software product. The user while developing the specification for software product may go through many iterations of editing the specification before the specification can be in its final form, which may be ready for review and/or publication.

Figure 3:
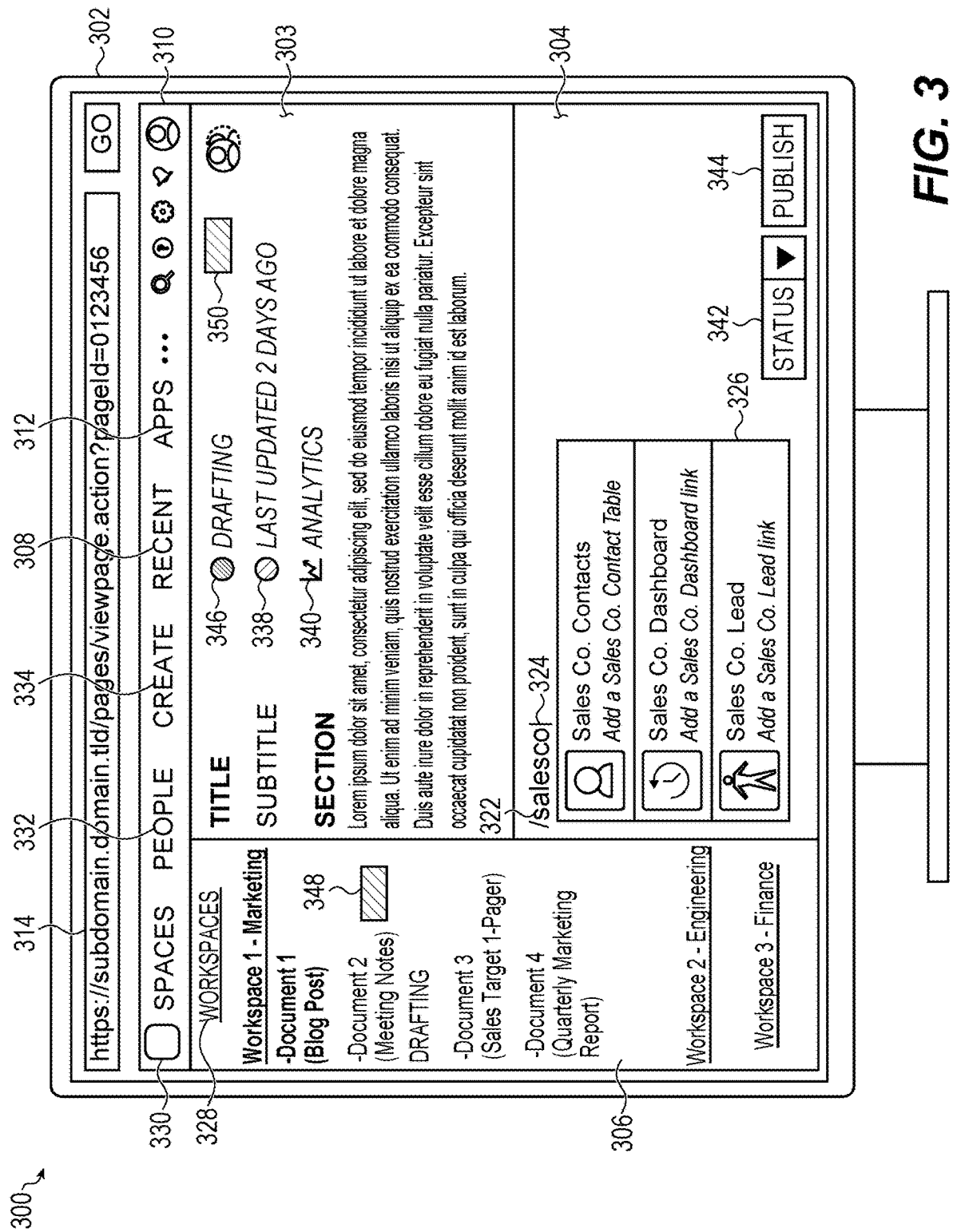
FIG. 3 depicts an example graphical user interface (GUI) of a front end application of a document management system, as described herein.

FIG. 3 depicts an example graphical user interface (GUI) of a frontend application of a document management system, as described herein.

The user while working on the specification may create a draft of the specification using an instance of a client application ("a frontend application") which may display a graphical user interface (GUI) to the user. By way of a non-limiting example, the client application or the frontend application may be a web browser application, a mobile application, and/or a native application executing on a client device. The user may select one or more different types of applications in an editing pane of the GUI for creating the specification draft. For example, the user may select a word application, an application to create a presentation and/or a slide, and so on in the editing pane of the GUI. In some cases, by way of a non-limiting example, a simple text-based user interface that can be used from within the GUI.

in some cases, once the user started creating the draft of the specification, the draft may be periodically and/or automatically saved so that the user does not has to worry about losing the work. In some cases, an indicator showing a save status of the draft specification may be shown on the GUI. While the user is working on the draft specification, the draft specification may be assigned a status, by default or by the user who is an author or a creator of the draft specification, for example, a work-in-progress and/or an incomplete. The draft specification with its status, for example, a work-in-progress and/or an incomplete ("a pre-publication state"), may only be accessible to the author or the creator of the draft specification. In some cases, the author may allow access to the draft specification to other users while the draft specification is in its pre-publication state.

FIGS. 3-9 depict example graphical user interface elements and a process flow that may be implemented using the network system 100 or 200. As discussed previously, the following examples are provided with respect to an example GUI of a frontend application running on a client device. However, a similar or the same approach can be applied to a variety of other types of systems including cloud-based document management systems (e.g., Google Docs), issue tracking systems (e.g., Jira or Trello), and other remotely hosted services and platforms.

FIGS. 3-9 depict an example GUI including an editable field in which a link-creation command may be initiated. The GUI 300 of FIG. 3 may be associated with a documentation or content creation platform, and may be shown on a display 302 of a client device, for example, 102A, 102B, or 202. The application of the following techniques and examples is not limited to this specific context and can be applied to a broad range of client application types having editable fields or other regions that are configured to receive text input. In this example, the GUI 300 may include an editable field 304. The editable field 304 may also be referred to herein as a content pane, an editor pane, a content-creation field or a user-editable region. Using a keyboard, touch screen, mouse, keypad, or any other user input device of client device, for example, the client device 202, the user can enter text, at a cursor position 324 displayed on the GUI 300.

The GUI 300 may include a variety of different fields and graphical objects that can be used to navigate user-generated content or other data provided by the platform. In this example, the GUI 300 may include a title bar 310 that may include, for example, a series of selectable options that may provide pull-down or pop-up menus containing a list or set of selectable items that is associated with a particular topic or grouping of functionalities. In one example, the title bar 310 may include, but not limited to, spaces 330 and/or people 332, each implemented as a pull-down or pop-up menu. The spaces 330 may list, for example, a location for saving a draft specification. In some cases, one or more spaces 330 may be pre-populated or selected by the author of the draft specification. The spaces may identify a location for saving the draft specification on the backend system, for example, the first platform 204 and/or the second platform 206.

In some cases, users tab 332 may list one or more users of a document management system for managing creation and/or publication of a document. The one or more users of the document management system may be a user, either selected by the author of the draft specification and/or selected based on a role of the author and/or hierarchy of an organization to which the author belongs. The one or more users listed under the people 332 may have access to the draft specification to perform various operations with respect to the draft specification, while the draft specification is in the pre-publication state. For example, a user of the one or more users may only view the draft specification in the pre-publication state. In some cases, a user of the one or more user may view and edit the draft specification, and/or comment on the draft specification.

In the GUI 300, the title bar 310 may also include a create tab 334, a recent tab 308, and/or an apps tab 312. A user may select or click the create tab 334 to create a new draft of a document. When the user selects of clicks the create tab 334, an editing pane 304 may be generated. In the editing pane 304, the user may enter details of the draft document using one or more input methods, such as a keyboard, a mouse, a microphone, and so on. For example, in the editing pane 304, a title of the draft document 322 and content of the draft document 326 may be shown, which may be edited by the user ("an author of the draft document"). The user may update the add, update, delete, and/or remove content of the draft document 326 using an interface built in the GUI and/or any other external application.

The recent tab 308 may display a list of one or more documents created and/or accessed by a user, who is logged in into a document management system. Accordingly, for the one or more documents created by the user, the GUI 300 may represent an author view of the GUI, and for the one or more documents that are not created by the user, the GUI 300 may represent a reader view of the GUI. In other words, the author view and/or the reader view may determine which fields and functions/services may be displayed to the user.

In some embodiments, when the user has selected a document from the recent tab 308 for which the user is an author or a creator of the document, additional tabs, for example, a publish tab 344, and a status tab 342 may also be displayed. The status tab 342 may be a pull down menu, and may allow the user to set a status of the draft document. The status may be pre-populated and listed. In some cases, the user may create one or more custom statuses, which may be then displayed for selection by the user. In some cases, the status may be represented as a text with/without an associated color, font, size, and/or shape, and so on. By way of a non-limiting example, the status of the document as set by the user (e.g., drafting) may also be displayed on the page as 346, 348, and/or 350. In some cases, the status of the document may be displayed on the page where it may be conspicuously visible to the user. In some cases, the status of the document may be displayed as flashing to get the user's attention. In some cases, the flashing indication of the status of the document may be turned off by the user.

In some embodiments, the publish tab 344 may allow the user to publish the draft document. Once the draft document is published, the draft document ("a document") may be available to one or more users of the document management system based on one or more permissions assigned to the one or more users.

In some embodiments, the GUI 300 may display one or more workspaces 328 as shown in FIG. 3. The one or more workspaces 328 and document hierarchy (page tree) for the one or more workspaces may be displayed, for example, in a navigational pane 306 on the GUI 300. As shown in the GUI 300, there may be one or more workspaces 328 may be shown anywhere on the GUI 300. In some cases, the one or more workspaces 328, for example, a workspace 1—Marketing, a workspace 2—Engineering, a workspace 3—Finance, and so on. The one or more workspaces 328 may be collapsible and/or expandable. In other words, the workspace may be expanded to display a page tree associated with and/or stored in the workspace. The page tree, as described above, may include one or more documents (nodes), for example, a Document 1, a Document 2, a Document 3, and/or a Document 4, and so on. The documents may be displayed according to their relationship with each other. For example, a "Document 1" may be a parent document, and a "Document 2," a "Document 3," and a "Document 4" may be one or more child documents of the parent document "Document 1." Accordingly, in the page tree 306, the Document 1 may be shown with its left indent set to 0, for example, and the child documents Document 2, Document 3, and Document 4 may be shown with left indent set to, for example, one tab or two tabs. In some cases, each document shown in the one or more workspaces 328 may also be displayed with its corresponding draft status.

In some embodiments, a document shown in the navigational pane may be selected by a user for viewing, editing, updating, and/or removing the document. When a user selects a document shown in the navigational pane, the selected document may be displayed in the content pane (or the editor pane) 304. In the editor pane 304, the user may update content of the document.

As shown in FIG. 3, document hierarchy of a workspace may be displayed in the navigational pane and/or editor pane of the GUI. The document hierarchy is referred in the present disclosure as a page tree, but may also be referenced using other terms not described herein by a person skilled in the art. The page tree may also show relationship of one document with another document in the workspace. However, other types of representation may also be used to display one or more documents in the navigational pane and/or editor pane. For example, in some cases, documents in a workspace may be listed alphabetically, by their last update date, and/or by author, and so on. Accordingly, in some cases, while displaying a document hierarchy, relationship between documents may or may not be displayed.

In some embodiments, the parent document and the child document each may have a status corresponding to the pre-publication state. When the user publishes the parent document, only the parent documents publication status may be updated to a published or post-publication state. However, when the user publishes the child document without explicitly publishing the parent document, document status for the parent document and the child document may be set to the published or post-publication state.

In some embodiments, when the parent document is deleted or removed, the child document may be designated as a parent document.

FIG. 4 is another example screen of the GUI of the front end application of the document management system, as described herein. As shown in FIG. 4, a view 400 of a GUI of a frontend application may include a number of documents 402, 404, and 406. The document 406 may have other subdocuments (child documents), for example, document 408, 410, 412, and 414. The document 408 may be a document being created by a user. In other words, the view 400 may be an author view of a page tree (as described above), and may display the document being created by the user along with other documents in a hierarchy of the number of documents. However, as described below, the document 408 which is in a pre-publication state may not be displayed in a page tree in a view of the GUI of the frontend application for another user ("a reader view"), if the document is not shared with the other user by the author of the document, and/or the other user is not a user included in the specific or predetermined subset of users. In other words, the view 400 may illustrate a page tree in a navigational pane of the GUI.

As stated above, a page tree may display a document or a node along with its publication status, and showing its relationship with other documents in the page tree. For example, the child documents 408, 410, 412, and 414 are shown with their left indent 420 and/or 422 set to at least one or more tabs more with respect to a left indent set for their parent document 406 in the page tree. A pre-publication status of a document may, for example, be shown as 416, and a published or post-publication status of a document may, for example, be shown as 418.

Further, a document shown in a page tree may be selected by a user for editing and/or updating the document. When the user selects a document shown in a page tree, the selected document may be shown in an editor pane. In the editor pane, a user may update content of the document. In some cases, a document shown in the navigational pane and/or the editor pane may also display in addition to a title of the document, other information such as information about an owner of the document, last updated date for the document, a project and/or a workspace associated with document, and so on. Any information shown in the navigational pane and/or the editor pane for a document may be extracted from metadata of the document, and/or may be stored in one or more fields of a document entry created in a database.

Figure 5:
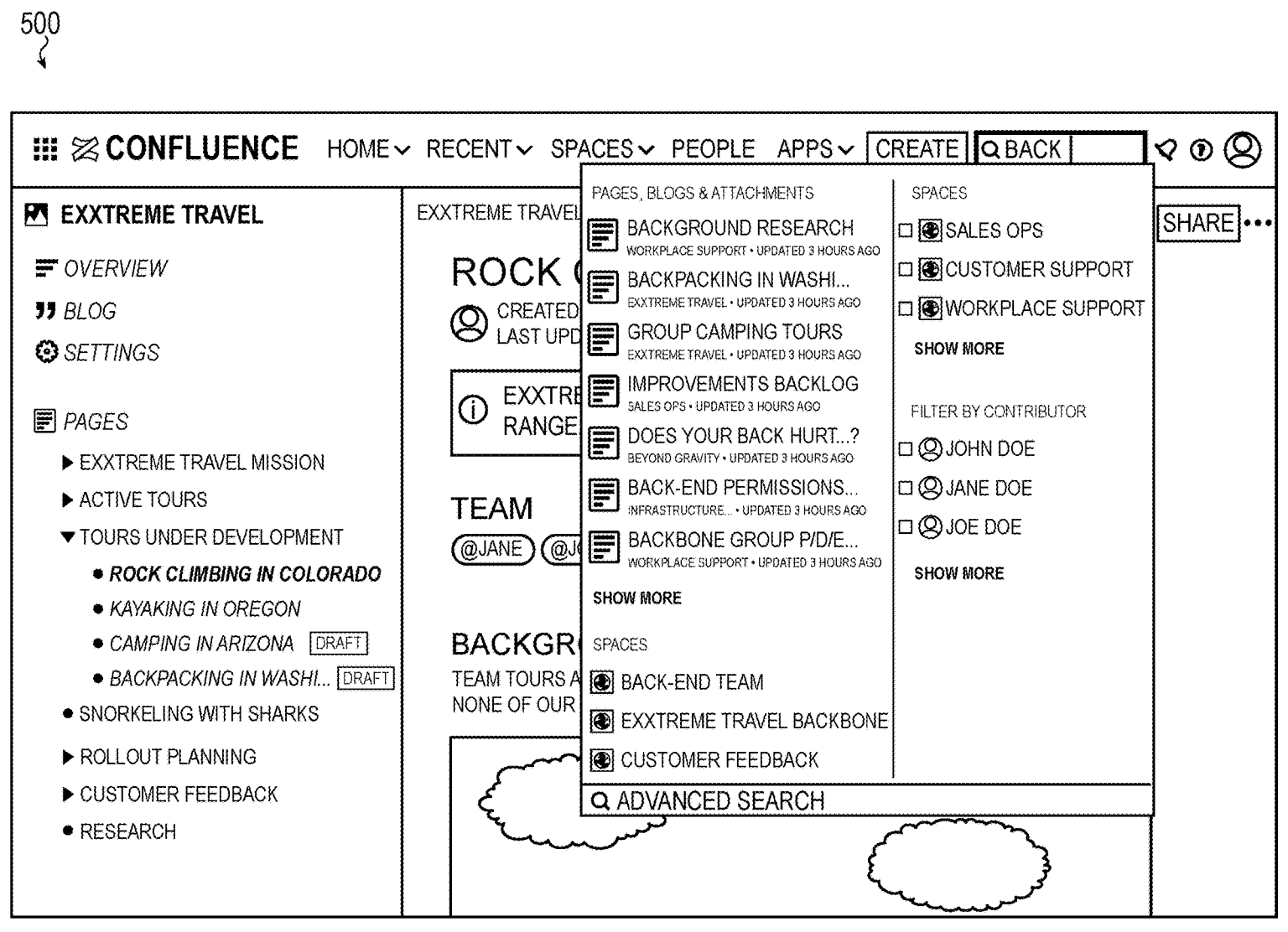

FIG. 5 is another example screen of the GUI of the front end application of the document management system, as described herein. As shown in FIG. 5, a view 500 of a GUI of a frontend application may describe a search function available to a user. As shown in FIG. 5, a user may search documents based on various criteria, including but not limited to, file name, a contributor (an author of a document, a reviewer of the document, and/or a commentor, and so on), workspace or a space in which a page may be stored, documents created and/or updated in a particular time period, one or more terms or phrases appearing in a file name and/or content of the document, and so on.

Based on the search criteria given by the user, a page tree may be displayed on the GUI of the client device. One or more documents of a search query result that matches the search criteria may be displayed as a page tree. The one or more documents displayed in the page tree may be displayed to the user according to displaying of the page tree as described above for the author view and/or the reader view of the page tree. The user may select a document displayed in the page tree for viewing, editing, and/or removing, and so on.

As described above, the page tree for the same search criteria may list different number of documents in an author view and in a reader view. In other words, in a reader view, a document with its draft status as a pre-publication state may be suppressed or not displayed in the page tree, when an authenticated user is not an author of the document with its draft status as the pre-publication state, and/or the user authenticated user is not a user of a specific or predetermined subset of users with whom the author of the document has shared the document as described herein.

Figure 6:
FIG. 6 is another example screen of the GUI of the front end application of the document management system, as described herein.

FIG. 6 is another example screen of the GUI of the front end application of the document management system, as described herein. In particularly, a view 600 of a GUI of a frontend application may list one or more documents that a user is working on. For example, one or more documents listed in the view 600 may be a document that the user has created and/or accessed for various purposes, including but not limited to, creating, editing, updating, removing, and/or a status update, and so on, over a different time periods, for example, today, in last 7 days, in last 30 days, and so on.

In some embodiments, a tab titled, for example, "My Documents," may be displayed on the GUI, which may provide easy access to the one or more documents the user has created and/or accessed for various purposes. As shown in FIG. 6, a document which is not yet published or in pre-publication state may be shown its current draft status in the page tree.

Figure 7:
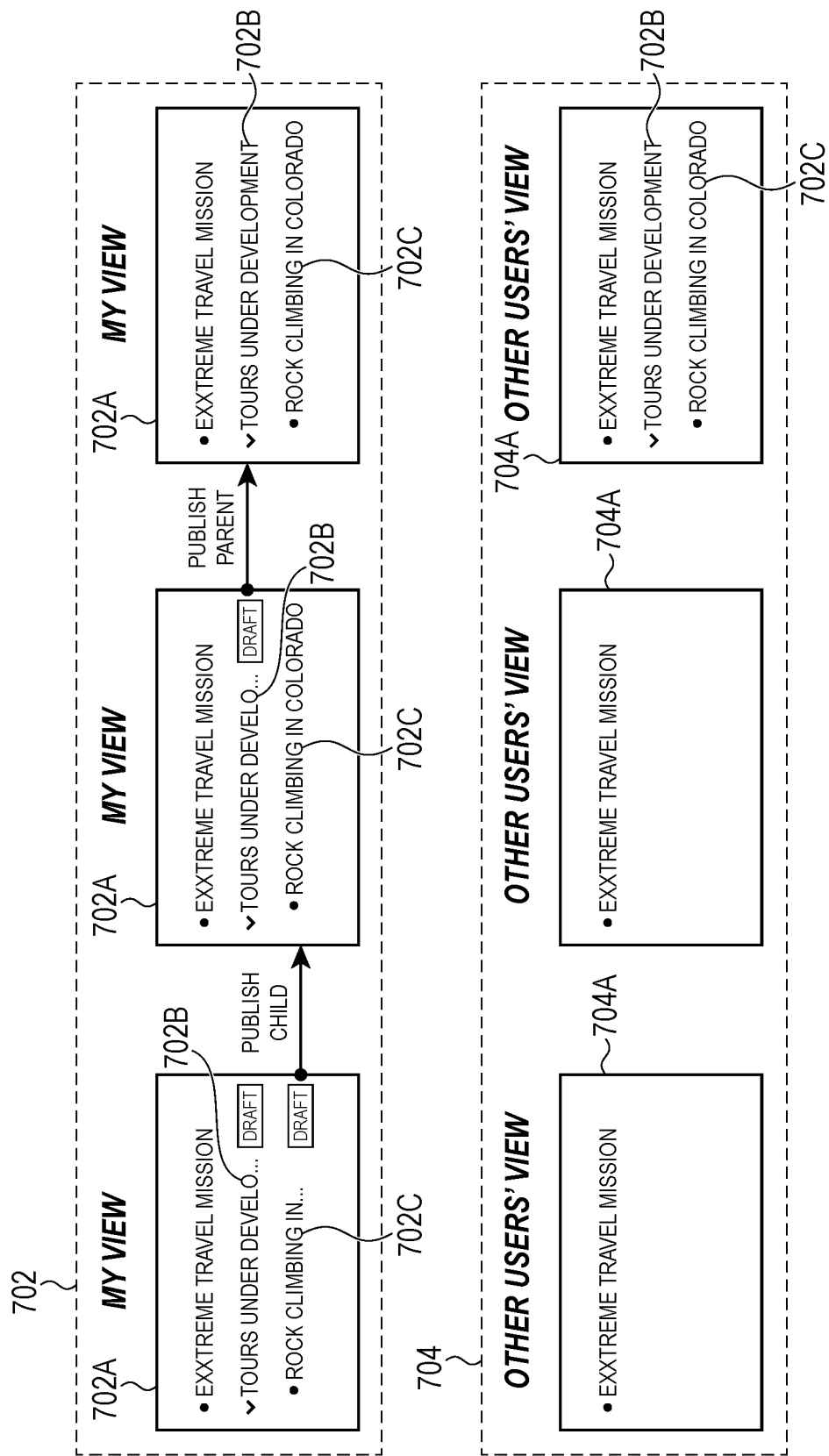
FIG. 7 is a flow chart illustrating a life cycle of a document in an author view and a reader view.

FIG. 7 is a flow chart illustrating a life cycle of a document in an author view and a reader view. In particular, a view 700 shown in FIG. 7 displays an example of an author view 702 and an example of a reader view 704. In the author view 702, a page tree 702a may include a parent document 702b and a child document 702c. A page status for both of the parent document 702b and 702c may be a pre-publication state. When the child document 702c is published, in other words, a draft status of the child document 702c is set by the author of the child document 702c is set to published, in one embodiment, the page status of the child document 702c may be updated to published or post-publication state, but the draft status of the parent document 702b may still remain as pre-publication state. And, when the parent document 702b is published, both the parent document 702b and the child document 702c may have their draft status updated to post-publication state. In a corresponding reader view 704, the page tree 704a may not list the parent document 702b and the child document 702c unless the parent document 702b and the child document 702c both are in published or post-publication state.

In some embodiments, if a parent document is published before a child document, the parent document is displayed in a page tree of the reader view but not the child document. In some embodiments, if a child document is published before a child document, both the parent document and the child document may be displayed in a page tree of the reader view. In other words, when the child document is published before the parent document, the parent document is published automatically.

Figure 8:
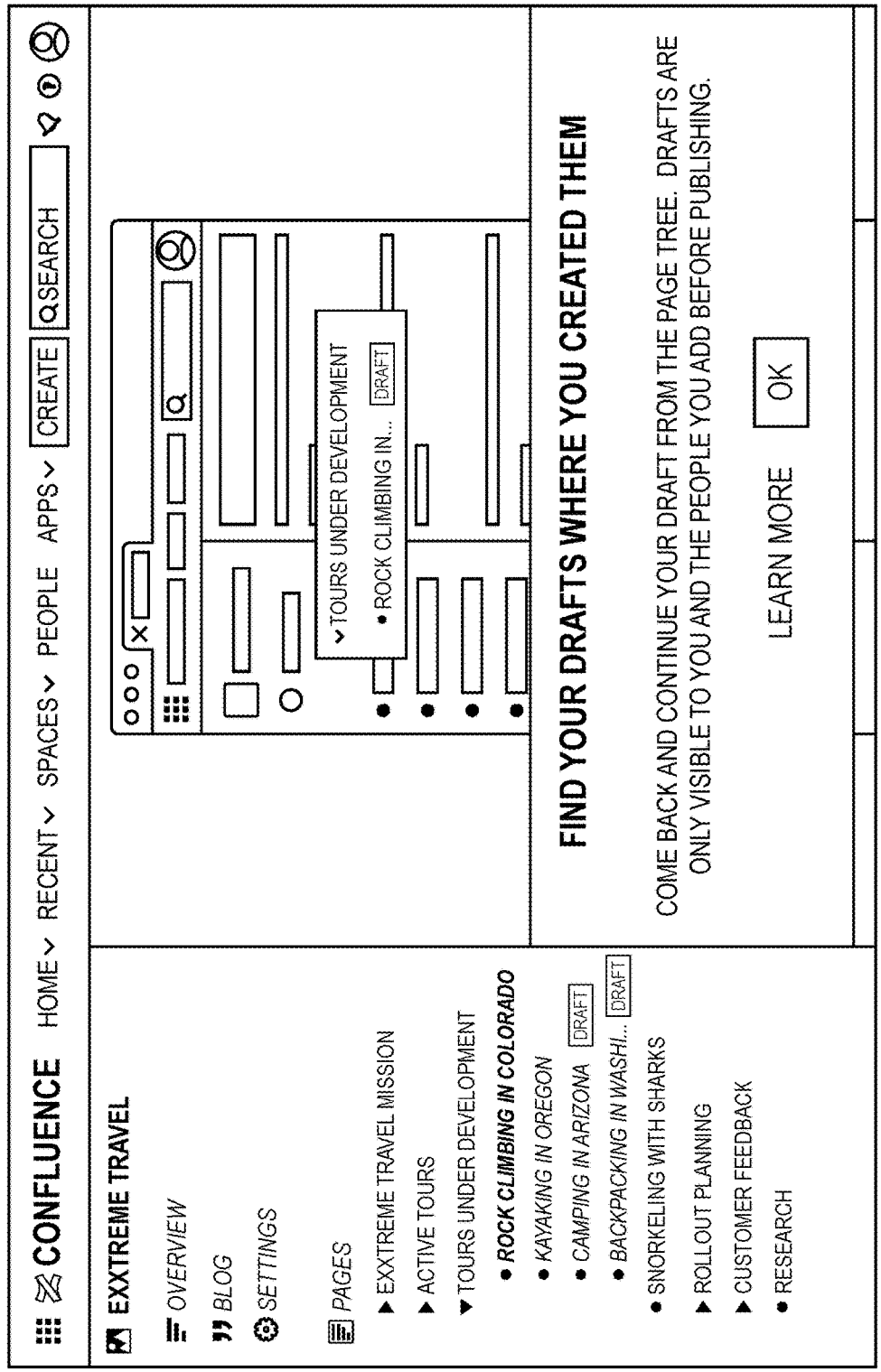
FIG. 8 is another example screen of the GUI of the front end application of the document management system, as described herein.

FIG. 8 is another example screen of the GUI of the front end application of the document management system, as described herein. In particular, a view 800 of a GUI of a frontend application illustrates a search function in which a user may search one or more documents that a user is currently working on, for example, creating and/or editing, and so on. In some embodiments, the user may perform search based on draft status of the documents. For example, the user may want to search documents that are still in draft or pre-publication state. The user may be returned a page tree displaying one or more documents for which the user is an author, and a draft status of the document is a pre-publication state. As shown in the view 800, the one or more documents that are in pre-publication state are visible only to an author of the document.

Figure 9A:
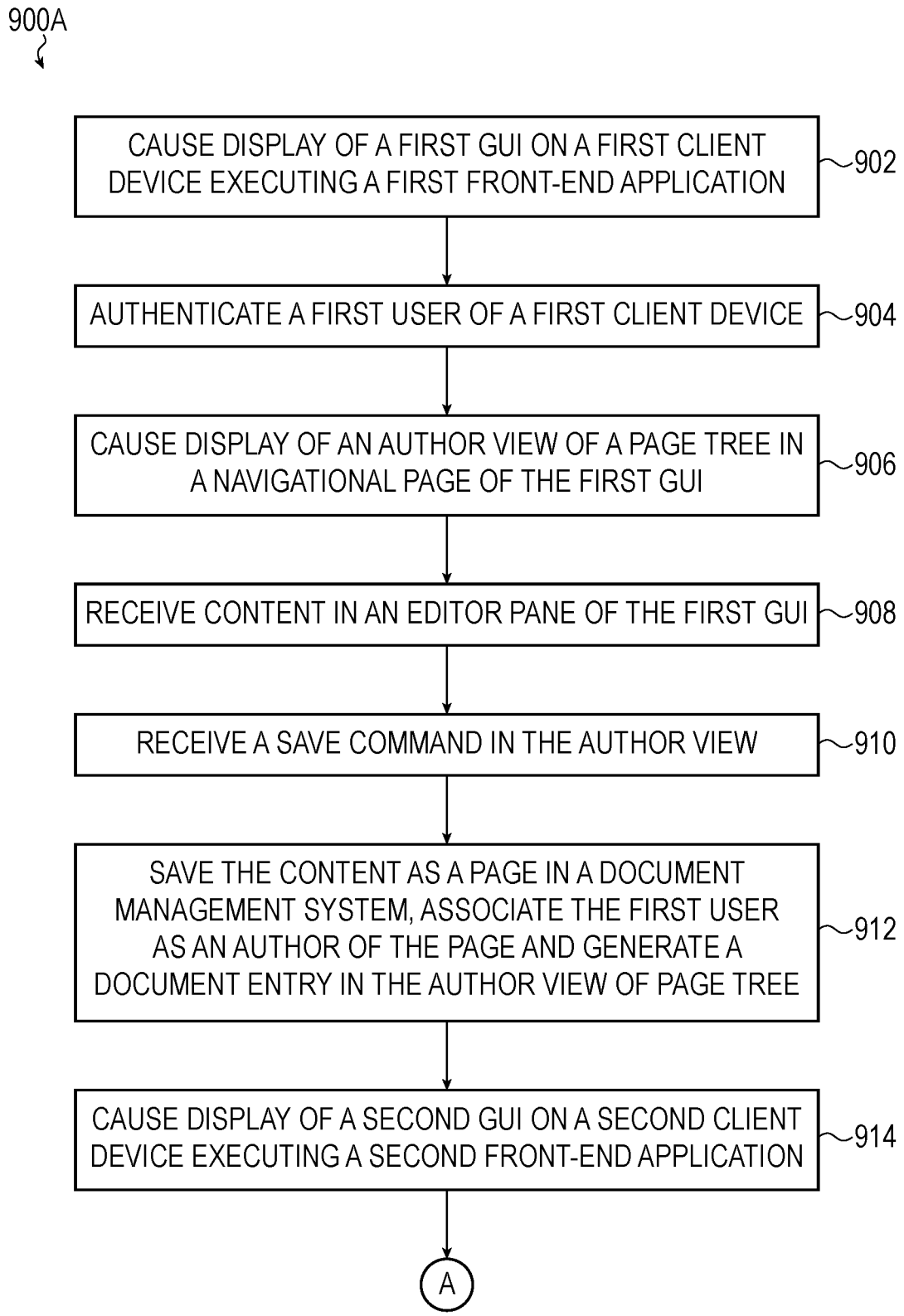
FIG. 9A and FIG. 9B each depicts a flow chart showing steps of a method for managing a document creation and publication, as described herein.
Figure 9B:
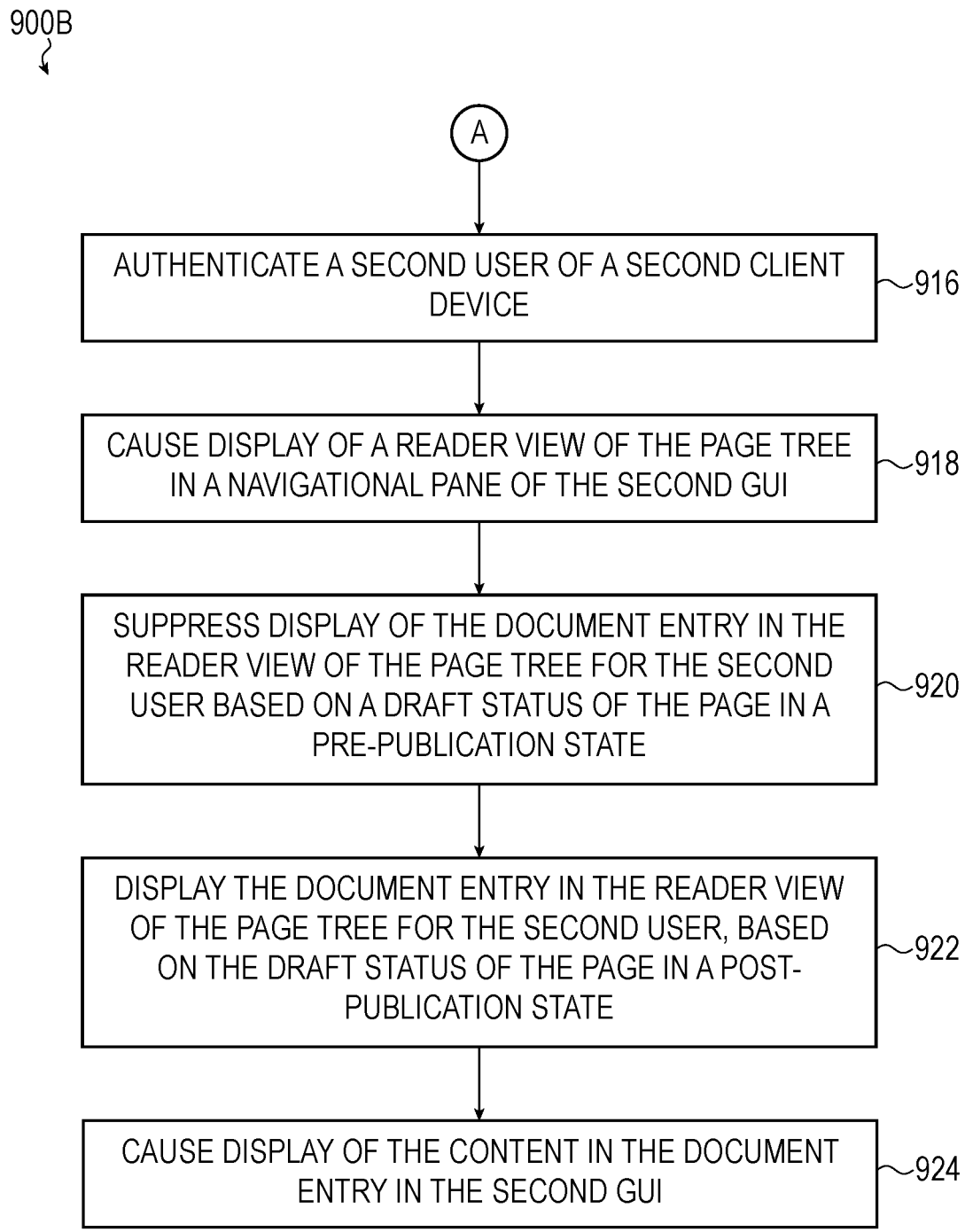

FIG. 9A and FIG. 9B each depicts a flow chart showing steps of a method for managing a document creation and publication, as described herein. As shown in flow chart 900A, at 902, a view of a GUI on a client device may be displayed. The view of the GUI may be a display of a first GUI on the client device, for example, a first client device. The first client device may be a device of a user who is creating a draft document using the first GUI of a frontend application ("a first frontend application"). The first frontend application may be communicatively coupled with a document management system running a backend application, as described herein. As a reference, the first client device executing the first frontend application for creating the draft document is described above using FIG. 1.

At 904, a user of the first GUI on the first client device may be authenticated by the backend application. The authentication may be performed using various authentication mechanism, including but not limited to, a user id and password, a single sign on, a device based authentication, and so on. In some cases, a two-factor authentication may also be performed. As described above with reference to FIG. 1, the authentication module 112A or 112B may authenticate the user of the first GUI on the first client device.

At 906, based on authentication result, a page tree ("a hierarchical document structure") may be displayed in a navigational pane of the first GUI. In the navigational pane, a user may select a document from a number of documents displayed in the page tree. As described above with reference to FIG. 3 above, in an author view of the page tree, one or more documents may be displayed for which the user is an author of the document and the document is in pre-publication state, and/or the user is one the specific or predetermined subset of users, and/or the document is in post-publication state.

At 908, a user may enter content to create and/or update a draft document in an editor pane of the first GUI, which is described in detail using FIG. 4 above. By way of a non-limiting example, the editor pane may be a portion of a GUI in which a user may enter data for the draft document using a text interface. In some cases, the editor pane may be a link to other applications, which the user may use to create and/or update the draft document.

At 910, when the user saves the created and/or updated draft document, the content of the draft document may be saved as a page in the document management system. The user may be associated as an author of the page. For example, as described above using FIG. 3, the document may be saved automatically when the user leaves the editor pane, and/or upon receiving a command or instruction to save the document. At 912, a document entry may be created and displayed in the author view of the page tree, as described above with reference to FIG. 3 and/or FIG. 4. The document entry may be displayed with a draft status indicator corresponding to a draft status of the page. As described herein, the draft status may identify that document is either in a pre-publication state or a post-publication state.

At 914, a view of a GUI on a second client device may be displayed. The view of the GUI on the second client device ("a second GUI") may be based on a frontend application ("a second frontend application") that is communication with the document management system running the backend application, as described herein. As a reference, the second client device executing the second frontend application is described above using FIG. 1.

At 916, a second user of the second client device may be authenticated as described above, for example, at 904. At 918, based on the authentication of the second user, a page tree ("a hierarchical document structure") may be displayed in a navigational pane of the second GUI. In the navigational pane, a user may select a document from a number of documents displayed in the page tree. Since the page tree and displaying of the one or more documents are described in detail above with reference to FIG. 3 and/or FIG. 4, the description is not repeated here again.

As described herein, at 920, a reader view displays a page tree that does not list one or more documents that are in pre-publication state and the user of the second client device is not an author for the same or the user is not one of the specific or predetermined subset of users, as described above with reference to FIG. 3. At 922, in the reader view, one or more documents that are in published or in post-publication state may be displayed in the page tree on the reader view of the second GUI on the second client device.

At 924, in the author view and/or the reader view, content of a document may be displayed in the first GUI and/or the second GUI based on a selection of a document entry by the first user and/or the second user for further processing as described above using FIG. 3. The user may select a document shown in the page tree for viewing and/or editing the selected document in the editor pane as described above using FIG. 3.

As described herein, in accordance with some embodiments, when a user selects the document for publication, the document entry may be updated to set a draft status of the page accordingly. In an author view, in an editor pane, the author of the document may update or provide additional content to the draft document. In some embodiments, the page may be automatically saved while the user is editing the content of the page. In some embodiments, in an author view and/or a reader view, one or more documents may be listed or suppressed based on a draft status for each of the one or more documents found based on a search criterion.

As described herein, a user may manage creation and publication of a document for a document management system.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A method for managing creation and publication of a document in a documentation management system, the method comprising:
    causing display of a first graphical user interface (GUI) on a first client device executing a first frontend application communicatively coupled with the document management system;
    authenticating, by a backend application of the document management system, a first user of the first client device;
    causing display of an author view of a hierarchical document structure in a navigational pane of the first GUI;
    receiving user-generated content in an editor pane of the first GUI;
    subsequent to saving the user-generated content in the document management system, generating a document entry in the author view of the hierarchical document structure, the document entry displayed with a draft status indicator corresponding to a draft status of a particular page;
    causing display of a second GUI on a second client device executing a second frontend application communicatively coupled with the document management system;
    authenticating, by the backend application, a second user of the second client device;
    causing display of a reader-view of the hierarchical document structure in a navigational pane of the second GUI;
    in accordance with the particular page corresponding to a post-publication state, display the document entry in the reader-view of the hierarchical document structure for the second user, the document entry comprising the draft status indicator; and
    in response to a user selection of the document entry, cause display of the content in the second graphical user interface.

2. The method of claim 1, further comprising:
    while the author view of the hierarchical document structure is being displayed:
        receiving additional content for the particular page in the editor pane of the first GUI; and
        automatically saving the particular page updated with the additional content.

3. The method of claim 1, further comprising:
    while the author view of the hierarchical document structure is being displayed:
        receiving a command to search a page space according to a search criterion; and
        causing display of a set of search results in the first GUI, the search results are displayed corresponding to the search criterion, including one or more pages in the page space in the set of search results.

4. The method of claim 1, further comprising:
    while the reader view of the hierarchical document structure being displayed:
        receiving a command to search a page space according to a search criterion; and causing display of a set of search results, the search results are displayed corresponding to the search criterion and the draft status corresponding to a pre-publication state of one or more pages in the page space by suppressing display of the particular page in the set of search results.

5. The method of claim 1, further comprising:
while reader view of the hierarchical document structure is being displayed:
receiving a command to search a document repository using a search criterion; and
causing display of a set of search results, the search results are displayed corresponding to the search criterion and the draft status corresponding to a post-publication state, by including the particular page in the displayed set of search results.

6. The method of claim 1, further comprising:
identifying, by the backend application, a parent page of the particular page; and
in response to deletion of the parent page, promoting the particular page from a child page to a new parent page, the new parent page having at least one child page.

7. The method of claim 1, further comprising:
in response to determining the particular page is a child page of a parent page and the page status of the child page corresponds to a post-publication state, setting, by the backend application, the draft status of the parent page to correspond to a post-publication state.

8. The method of claim 1, further comprising:
in accordance with the draft status of the particular page being set to the pre-publication state, allowing at least read access to the particular page by a set of predefined users; and
while displaying the reader view of the hierarchical document structure:
in accordance with the reader view being displayed in a GUI operated by one of the set of predefined users, causing display of the particular page in the GUI.

9. The method of claim 1, further comprising:
evaluating, by the backend application, content of the page; and
designating the particular page as being empty in response to the content corresponding to no data or a substantially blank page.

10. The method of claim 9, wherein the evaluating of the particular page is performed periodically or at a user-specified time.

11. The method of claim 9, further comprising:
removing, by the backend application, the particular page including no data or the blank page from the document management system.

12. A documentation management system for managing creation and publication of a document, the documentation management system comprising:
one or more processors; and
one or more memories storing instructions, which when executed by the one or more processors, cause the one or more processor to perform operations comprising:
causing display of a first graphical user interface (GUI) on a first client device executing a first frontend application communicatively coupled with the document management system;
authenticating a first user of the first client device;
causing display of an author view of a hierarchical document structure in a navigational pane of the first GUI;
receiving user-generated content in an editor pane of the first GUI;
subsequent to saving the user-generated content in the document management system, generating a document entry in the author view of the hierarchical document structure, the document entry displayed with a draft status indicator corresponding to a draft status of a page;
causing display of a second GUI on a second client device executing a second frontend application communicatively coupled with the document management system;
authenticating a second user of second client device;
causing display of a reader-view of the hierarchical document structure in a navigational pane of the second GUI;
in accordance with the page corresponding to a post-publication state, display the document entry in the reader-view of the hierarchical document structure for the second user, the document entry comprising the status indicator; and
in response to a user selection of the document entry, cause display of the content in the second graphical user interface.

13. The document management system of claim 12, wherein the operations further comprise:
in response to receiving a publish command in the first GUI:
updating the draft status indicator for the document entry to indicate the draft status of the page.

14. The document management system of claim 12, wherein the operations further comprise:
while the author view of the hierarchical document structure is being displayed:
receiving additional content for the page in the editor pane of the first GUI; and
automatically saving the page updated with the additional content.

15. The document management system of claim 12, wherein the operations further comprise:
identifying a parent page of the page; and
in response to deletion of the parent page, promoting the page from a child page to a new parent page, the new parent page having at least one child page.

16. The document management system of claim 12, wherein the operations further comprise:
in response to determining the page is a child page of a parent page and the page status of the child page corresponds to a post-publication state, setting the draft status of the parent page to correspond to a post-publication state.

17. A non-transitory computer-readable medium (CRM) comprising instructions, which when executed by one or more processors of a document management systems, cause the one or more processors to perform operations comprising:
causing display of a first graphical user interface (GUI) on a first client device executing a first frontend application communicatively coupled with the document management system;
authenticating a first user of the first client device;
causing display of an author view of a hierarchical document structure in a navigational pane of the first GUI;
receiving content in an editor pane of the first GUI;
subsequent to saving the user-generated content in the document management system, generating a document entry in the author view of the hierarchical document structure, the document entry displayed with a draft status indicator corresponding to a draft status of a page;

causing display of a second GUI on a second client device executing a second frontend application communicatively coupled with the document management system;

authenticating a second user of second client device;

causing display of a reader-view of the hierarchical document structure in a navigational pane of the second GUI;

in accordance with the page corresponding to a post-publication state, display the document entry in the reader-view of the hierarchical document structure for the second user, the document entry comprising the draft status indicator; and in response to a user selection of the document entry, cause display of the content in the second graphical user interface.

18. The non-transitory CRM of claim 17, wherein the draft status indicator is displayed in the editor pane or the navigational pane in the first GUI.

\* \* \* \* \*